United States Patent
Lee (10) Patent No.: US 11,135,660 B2
(45) Date of Patent: Oct. 5, 2021

(54) CUTTING PROCESSING SYSTEM AND PERFORMANCE TEST PAPER FOR EVALUATING DISCHARGE RESPONSIVENESS THEREOF

(71) Applicants: HYUNDAI MOTOR COMPANY, Seoul (KR); KIA MOTORS CORPORATION, Seoul (KR)

(72) Inventor: Nam-Doo Lee, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/682,681

(22) Filed: Nov. 13, 2019

(65) Prior Publication Data

US 2020/0147702 A1 May 14, 2020

(30) Foreign Application Priority Data

Nov. 14, 2018 (KR) .................. 10-2018-0139873

(51) Int. Cl.
*B23Q 11/10* (2006.01)
*B23B 51/06* (2006.01)

(52) U.S. Cl.
CPC .......... *B23B 51/06* (2013.01); *B23Q 11/1023* (2013.01)

(58) Field of Classification Search
CPC ............ B23Q 11/1023; B23Q 11/1015; B23Q 11/1046; B23Q 11/103
See application file for complete search history.

(56) References Cited

U.S. PATENT DOCUMENTS 9,144,871 B2 * 9/2015 Haas .................... B23Q 11/103

FOREIGN PATENT DOCUMENTS

KR 20160081327 A 7/2016
WO WO-02064310 A1 * 8/2002 ......... B23Q 11/1015

OTHER PUBLICATIONS

English translation of WO 02064310 A1, Aug. 2002 (Year: 2002).*

* cited by examiner

*Primary Examiner* — Alan Snyder
(74) *Attorney, Agent, or Firm* — Lempia Summerfield Katz LLC (57) ABSTRACT

A cutting processing system includes: a spindle mounted with a cutting tool in which a lubrication discharge path is formed along the central axis thereof for rotating the cutting tool; a lance provided inside the spindle in order to supply oil and air to the cutting tool; and a rotary union mounted on the end portion of the spindle for supplying the oil and the air to the lance in a non-mixed state.

15 Claims, 9 Drawing Sheets

CUTTING PROCESSING SYSTEM AND PERFORMANCE TEST PAPER FOR EVALUATING DISCHARGE RESPONSIVENESS THEREOF

CROSS-REFERENCE TO RELATED APPLICATION

This application claims priority to Korean Patent Application No. 10-2018-0139873, filed on Nov. 14, 2018, which is incorporated herein by reference in its entirety.

BACKGROUND OF THE DISCLOSURE

Field of the Disclosure

The present disclosure relates to a cutting processing system and a performance test paper for evaluating the discharge responsiveness thereof, and more particularly, to a cutting processing system for performing a cutting process by discharging mist mixing oil and air to a workpiece.

Description of Related Art

Products such as an engine and a transmission are manufactured through casting. If necessary, a hole or a groove is formed through cutting. Generally, cutting oil is supplied to a cutting area in order to prevent breakage of a cutting tool (drill), to lower the heat generated in the product, and to prevent the generated chip (iron powder) from floating in the air during the cutting process. However, there is a high possibility that the oil leaks during the cutting process, which pollutes the floor of the treatment facility where the cutting process is performed. Odor is likely to occur as the evaporated oil is contained in the air inside the treatment facility.

Considering this point, a Minimal Quantity Lubrication (MQL) technology has emerged that discharges a minimum amount of mist mixing oil and air to the cut portion in order to prevent pollution of the floor of the treatment facility and occurrence of the odor of the treatment facility by supplying a minimum amount of the oil required for cutting to the cut area to prevent leakage of the oil.

The Minimal Quantity Lubrication technology should discharge the mist mixing air and oil through the cutting tool at the start of the cutting processing. However, the oil is formed at the boundary of the line supplying the mist to the cutting tool, such that it is difficult to discharge the mist mixing air and oil at the start of the cutting process. The discharge responsiveness is low due to a time difference.

In addition, since the supply amount of the oil is minimized, the chip generated at the cutting processing portion may not be separated from the processing portion, such that a technique for separating the chip from the processing portion more smoothly is required.

In addition, it may be selectively used for the cutting processing among various cutting tools if necessary. Therefore, there is a need for a technique capable of evaluating the discharge responsiveness regardless of the type of the cutting tool.

The contents described in Description of Related Art are to help the understanding of the background of the present disclosure and may include what is not previously known to those having ordinary skill in the art to which the present disclosure pertains.

SUMMARY OF THE DISCLOSURE

Accordingly, an object of the present disclosure is to provide a cutting processing system capable of improving the discharge responsiveness of a cutting processing apparatus to which the Minimal Quantity Lubrication technology is applied.

In addition, another object of the present disclosure is to provide a cutting processing system capable of more smoothly separating the chip generated during the cutting processing through the cutting processing apparatus to which the Minimal Quantity Lubrication technology is applied.

In addition, still another object of the present disclosure is to provide a performance test paper for evaluating the discharge responsiveness of the cutting processing system capable of evaluating the discharge responsiveness regardless of the type of the cutting tool.

A cutting processing system according to an embodiment of the present disclosure for achieving the objects includes: a spindle mounted with a cutting tool in which a lubrication discharge path is formed along the central axis thereof and for rotating the cutting tool; a lance provided inside the spindle in order to supply oil and air to the cutting tool; and a rotary union mounted on the end portion of the spindle for supplying the oil and the air to the lance in a non-mixed state.

In addition, the lance may include an internal pipe through which the oil flows and an external pipe being concentric with the internal pipe, disposed outside the internal pipe, and through which the air flows.

In addition, the spindle may include a body having a through hole in which the lance is disposed and a cover mounted on the body to connect the lance and the rotary union.

In addition, the cover may include a first joint fixed to the outside of the through hole for guiding the lance so that one side end portion of the lance is disposed on the central axis of the through hole. The cover may also include a second joint for fixing the rotary union to the first joint in order to maintain the state where the one side end portion of the lance has been fastened with a coupling part of the rotary union.

In addition, the first joint may provide a fastening space into which the coupling part is inserted to be fastened with the lance. The second joint includes a first coupling ring through which the coupling part of the rotary union passes and having the end portion inserted into the fastening space. The second joint also includes a second coupling ring provided between the first joint and the first coupling ring to be concentric with the first coupling ring. The second coupling ring may be fixed to the first joint and the first coupling ring may be fixed to the second coupling ring.

In addition, the spindle may include a drill holder for holding the cutting tool and a rotating part fastened with the drill holder for rotating the drill holder with an external rotational force. The other side end portion of the lance may be protruded from the center of the rotating part. The air and the oil may be received into the drill holder through the lance and then mixed in the state where the drill holder has been fastened to the rotating part.

In addition, the inside of the drill holder may include: a MQL tube being concentric with the cutting tool and into which the other side end portion of the lance is inserted; a steel tube being concentric with the cutting tool and extended from the MQL tube toward the cutting tool; and an adjusting screw in a tubular shape into which one side end portion of the steel tube is inserted and contacting the cutting tool. The one side end portion of the adjusting screw in contact with the cutting tool may be provided to be gradually expanded. The one side end portion of the cutting tool in contact with the adjusting screw may be provided to be gradually reduced.

In addition, the air and the oil may be mixed in the MQL tube.

In addition, the cutting processing system may further include a pneumatic unit for supplying the air to the rotary union, an oil supply unit for supplying the oil to the rotary union, and a controller for controlling operations of the rotary union, the pneumatic unit, and the oil supply unit.

In addition, the pneumatic unit may include a pressure intensifier for intensifying the air received from the outside and a surge tank for receiving and storing the air intensified from the pressure intensifier.

A cutting processing system of an embodiment of the present disclosure for achieving the objects provides a performance test paper for evaluating a discharge responsiveness of a cutting processing system in order to evaluate the discharge responsiveness regardless of the type of cutting tool used. The performance test paper for evaluating the discharge responsiveness of the cutting processing system includes an X-Y coordinate axis, which becomes a reference of the horizontal movement and the vertical movement of the spindle and a plurality of discharge lines illustrated to be horizontal with the X axis of the X-Y coordinate axis in order to become the injecting target of the mixed mist of the oil and the air through the cutting tool. The plurality of discharge lines is arranged at regular intervals along the Y axis of the X-Y coordinate axis.

In addition, the origin (0, 0) of the X-Y coordinate axis may be a lower left corner of the performance test paper.

In addition, a test start position point where the spindle starts rotating may be provided at one side of each of the plurality of discharge lines. A test stop position point where the rotation and movement of the spindle are stopped may be provided at another side of each of the plurality of discharge lines.

In addition, the test start position point and the test stop position point may be horizontal with the plurality of discharge lines and may be provided in the state of being spaced apart from each other to have a distance from each of the plurality of discharge lines.

In addition, a horizontal dimension line for measuring the horizontal movement distance of the spindle may be provided under the plurality of discharge lines. A vertical dimension line for measuring the height movement distance of the spindle and the test cycle may be provided on a side portion of the plurality of discharge lines.

In addition, the performance test paper for evaluating the discharge responsiveness of the cutting processing system may further include a remarks column for writing a test date, a movement speed of the spindle, and a revolutions-per-minute (RPM) of the spindle.

According to the cutting processing system of an embodiment of the present disclosure, it is possible to supply oil and air to the cutting tool in a non-mixed state through the lance, thereby minimizing the mist formation phenomenon and improving the mist discharge responsiveness through the cutting tool.

In addition, it is possible to supply air to the cutting tool in a state further pressurized through the pressure intensifier to discharge the mist to the processing portion at a greater pressure, thereby separating the chip generated during the cutting processing from the processing portion more smoothly.

In addition, it is possible to perform the test actually discharging the mist from the cutting tool toward the performance test paper, thereby evaluating the mist discharge responsiveness through the cutting tool regardless of the type of the cutting tool.

DESCRIPTION OF SPECIFIC EMBODIMENTS

Hereinafter, a cutting processing system according to an embodiment of the present disclosure will be described in detail with reference to the accompanying drawings.

As illustrated in FIGS. 1-9, a cutting machining system according to an embodiment of the present disclosure includes a spindle 100 mounted with a cutting tool D on which a lubrication discharge path is formed along the central axis thereof for rotating the cutting tool D. The cutting machining system also includes a lance 200 provided in the spindle 100 in order to supply oil and air to the cutting tool D and a rotary union 300 mounted on the end portion of the spindle 100 for supplying oil and air to the lance in a non-mixed state. The cutting machining system also includes a pneumatic unit 400 for supplying the air to the rotary union 300, an oil supply unit 500 for supplying the oil to the rotary union 300, and a controller 600 for controlling operations of the rotary union 300, the pneumatic unit 400, and the oil supply unit 500.

Figure 2:
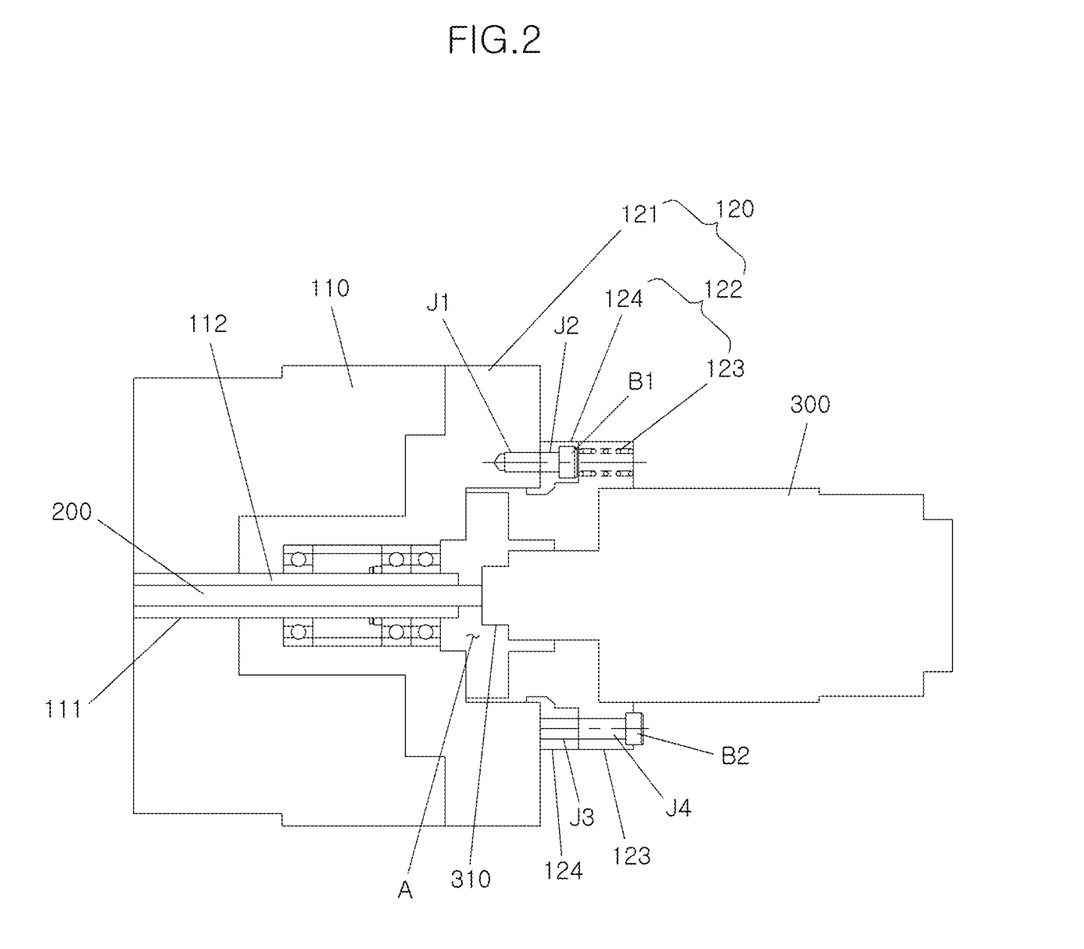
FIG. 2 is a diagram of coupling a spindle and a rotary union of FIG. 1.

Referring to FIG. 2, the spindle 100 includes a body 110 having a through hole 111 in which the lance 200 is disposed and a cover 120 mounted on the body 110 to connect the lance 200 and the rotary union 300. A shaft 112 for rotating the cutting tool D and a motor (not illustrated) for rotating the shaft 112 are provided in the body 110. The through hole 111 in which the lance 200 is mounted is concentric with the shaft 112. As the cover 120 is provided, the rotary union 300 may also be mounted on the spindle 100 without changing the shape thereof, which has been conventionally used.

The cover 120 is fixed to the outside of the through hole 111. The cover 120 includes a first joint 121 for guiding the lance 200 so that one side end portion of the lance 200 is disposed on the central axis of the through hole 111. The cover 120 also includes a second joint 122 for fixing the rotary union 300 to the first joint 121 in order to maintain the state where one side end portion of the lance 200 has been fastened with a coupling part 310 of the rotary union 300.

The first joint 121 provides a fastening space A in which the coupling part 310 of the rotary union 300 is inserted for fastening with the lance 200. The second joint 122 includes a first coupling ring 123 through which the coupling part 310 of the rotary union 300 passes, where the end portion thereof is inserted into the fastening space A. The second joint 122 also includes a second coupling ring 124 provided between the first joint 121 and the first coupling ring 123 to be concentric with the first coupling ring 123. The rotary union 300 is fitted in the first coupling ring 123. The position thereof is fixed as it is pressurized by the second coupling ring 124.

The second coupling ring 124 has a fastening hole J2 that coincides with a fastening groove J1 provided in the first joint 121. A bolt B1 is fastened to the fastening groove J1 of the first joint 121 and the fastening hole J2 of the second coupling ring 124 so that the second coupling ring 124 is fixed to the first joint 121. The second coupling ring 124 has a fastening groove J3. The first coupling ring 123 has a fastening hole J4 that is coincident with the fastening groove J3 of the second coupling ring 124. A bolt B2 is fastened to the fastening groove J3 of the second coupling ring 124 and the fastening hole J4 of the first coupling ring 123 so that the first coupling ring 123 is fixed to the second coupling ring 124.

Figure 3:
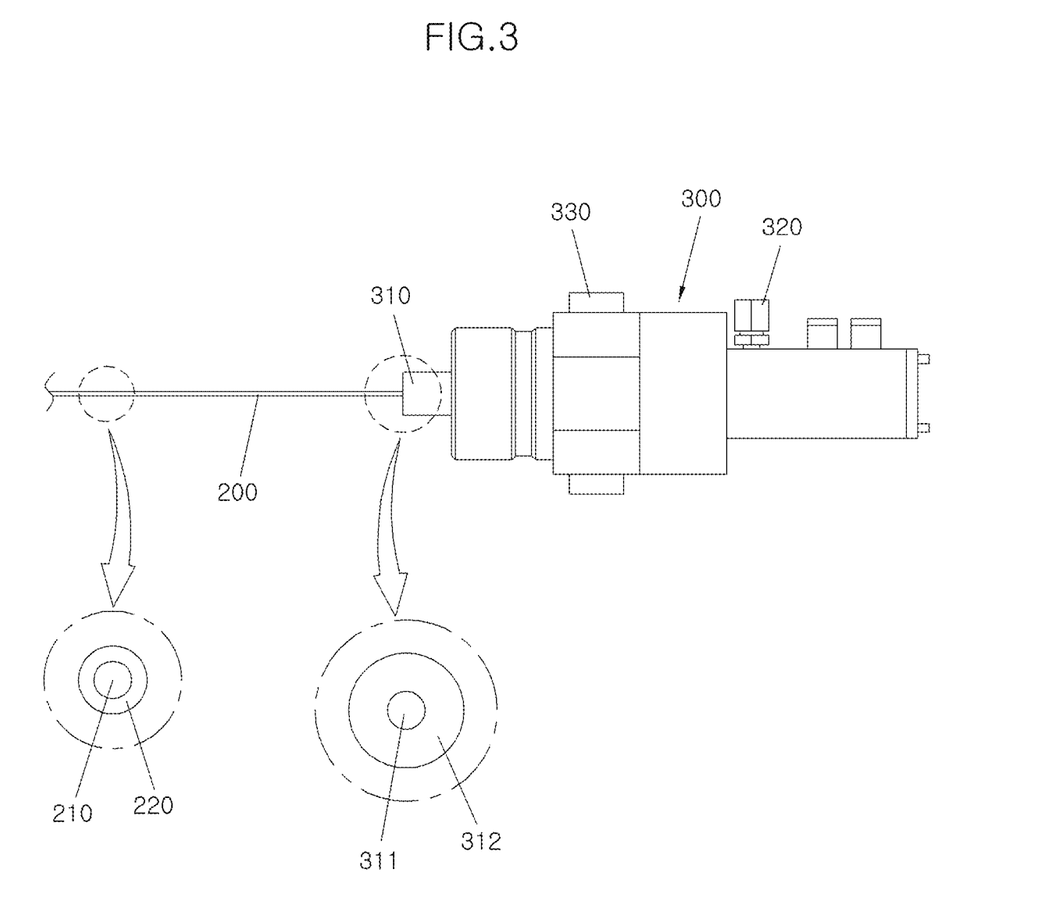
FIG. 3 is a diagram of coupling the rotary union and a lance of FIG. 1.

Referring to FIG. 3, the lance 200 is a double pipe body. The lance 200 includes an internal pipe 210 through which the oil flows and an external pipe 220 concentric with the internal pipe 210, disposed outside the internal pipe 210, and through which the air flows.

The rotary union 300 is mounted at one side of the body of the spindle 100 in the longitudinal direction thereof. The rotary union 300 includes a pneumatic injecting port 320 for receiving the air from the pneumatic unit 400 and an oil injecting port 330 for receiving the oil from the oil supply unit 500.

The rotary union 300 has the coupling part 310 coupled with the lance 200. The coupling part is provided so that a discharge port 311 for connecting the internal pipe 210 of the lance 200 and the oil injecting port 330 and a discharge port 312 for connecting the external pipe 220 of the lance 200 and the pneumatic injecting port 320 to have the form of a double pipe.

Figure 1:
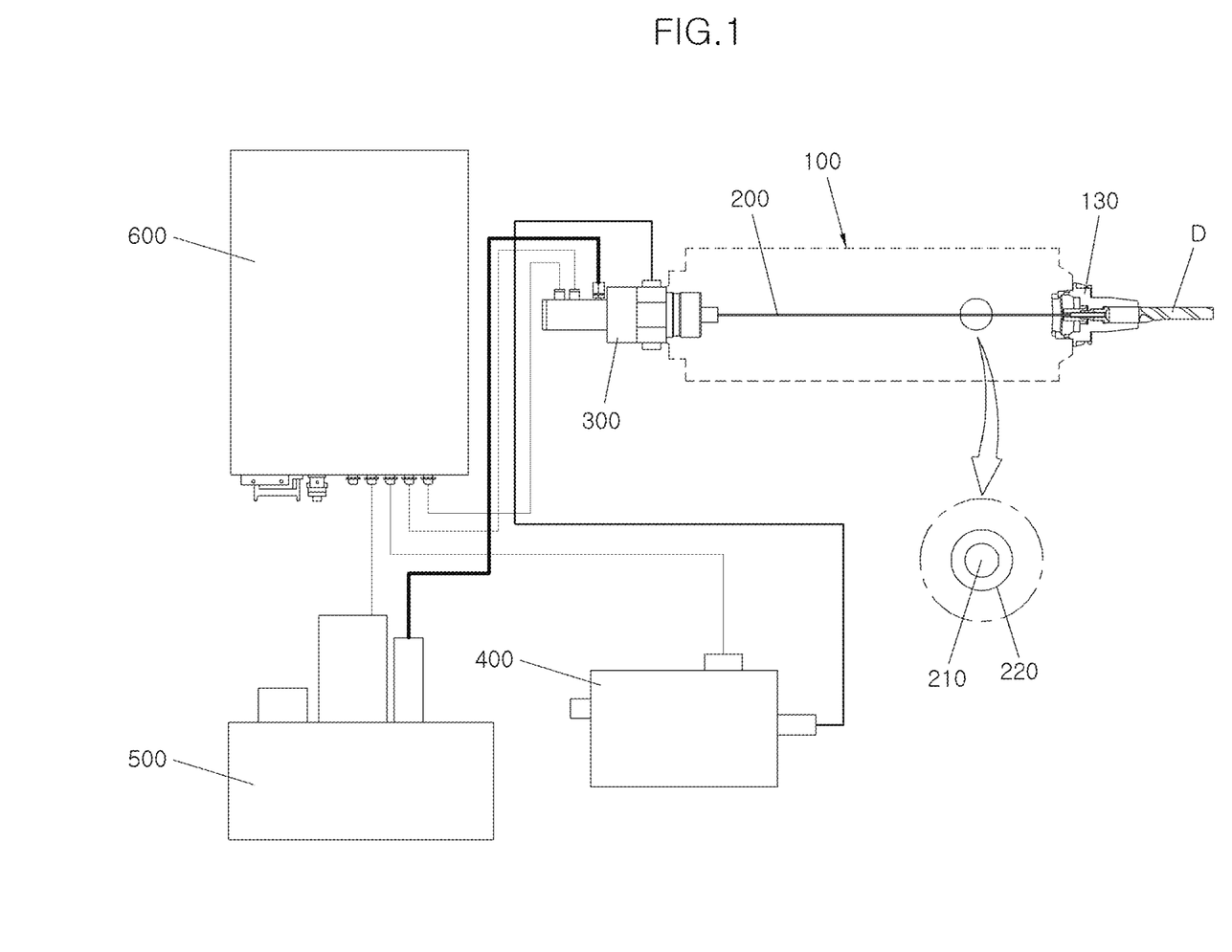
FIG. 1 is a diagram of a cutting processing system of an embodiment of the present disclosure.

The controller 600 controls the operations of the rotary union 300, the pneumatic unit 400, and the oil supply unit 500 according to the shape of the cutting tool D and the cutting conditions, thereby controlling the flow rate of the mist discharged to the cut area through the cutting tool D.

Figure 4:
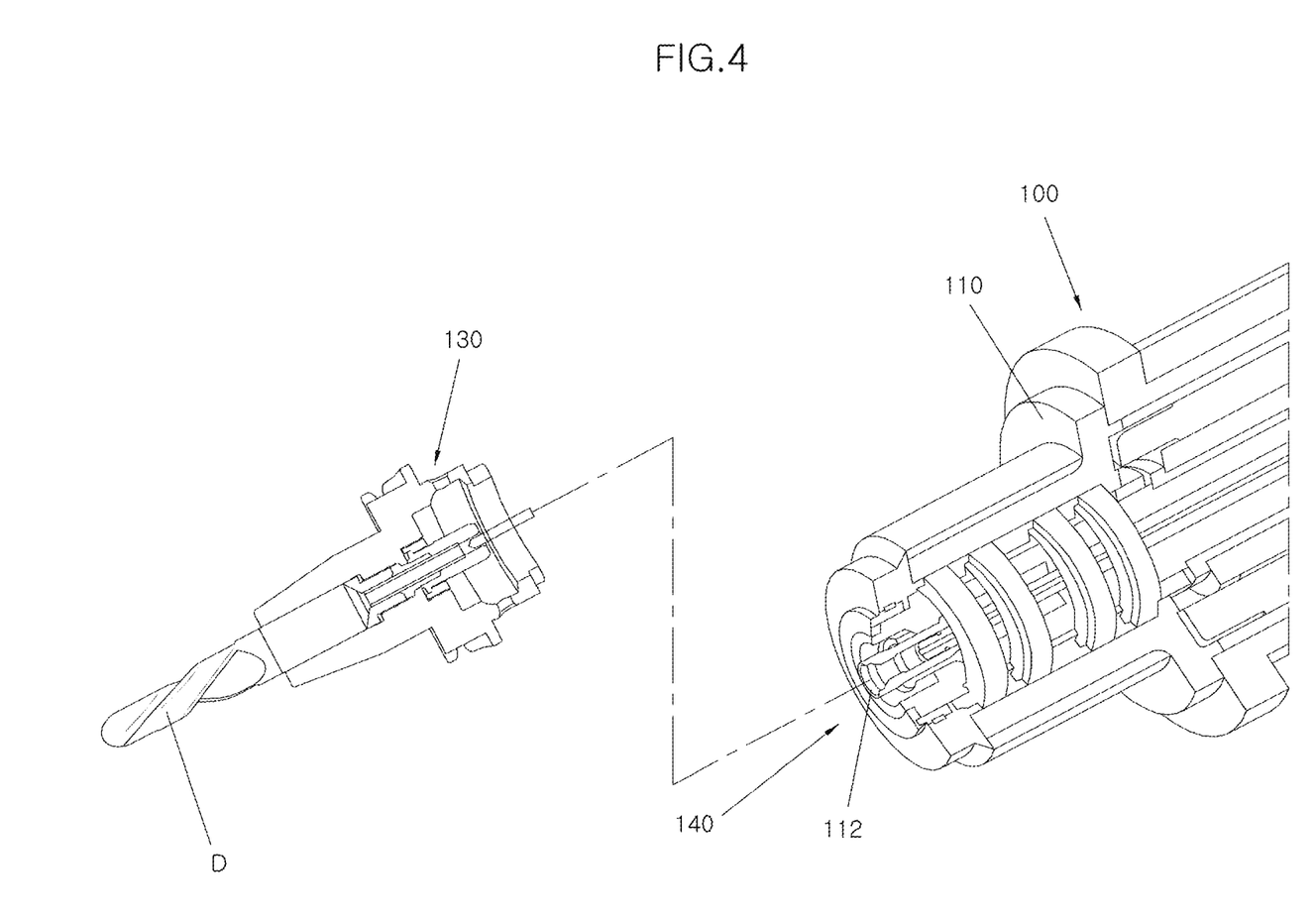
FIG. 4 is a diagram of coupling the rotating part of the spindle and a drill holder of FIG. 1.
Figure 5:
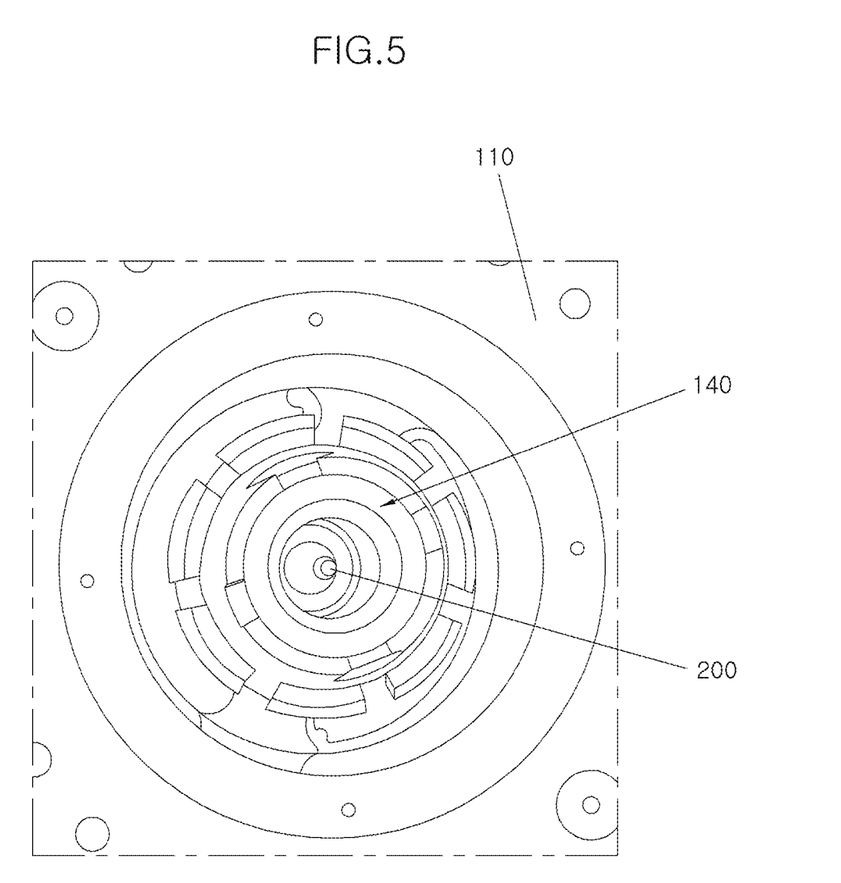
FIG. 5 is a front diagram of the rotating part of FIG. 4.

Referring to FIGS. 4 and 5, a rotating part 140 for rotating the cutting tool D is provided at one side of the body 110 of the spindle 100. The rotating part 140 is connected to the shaft 112 provided inside the body 110 of the spindle 100. A drill holder 130 holding the cutting tool D is mounted on the rotating part 140. The drill holder 130 is rotated by the rotation of the rotating part 140. The cutting tool D is ultimately rotated. The end portion of the lance 200 is protruded from the center of the rotating part 140. In the state where the drill holder 130 has been fastened to the rotating part 140, the air and the oil are received into the drill holder 130 through the lance 200 and then mixed.

Referring to FIGS. 6-9, an MQL tube 131, a steel tube 132, and an adjusting screw 133 are provided in the drill holder 130. The MQL tube 131 is mounted in the drill holder 130 to be concentric with the cutting tool D. The end portion of the lance 200 protruded from the center of the rotating part 140 is inserted into the end portion of the MQL tube 131. The oil and the air are mixed on the end portion of the MQL tube 131 into which the end portion of the lance 200 has been inserted.

Figure 6:
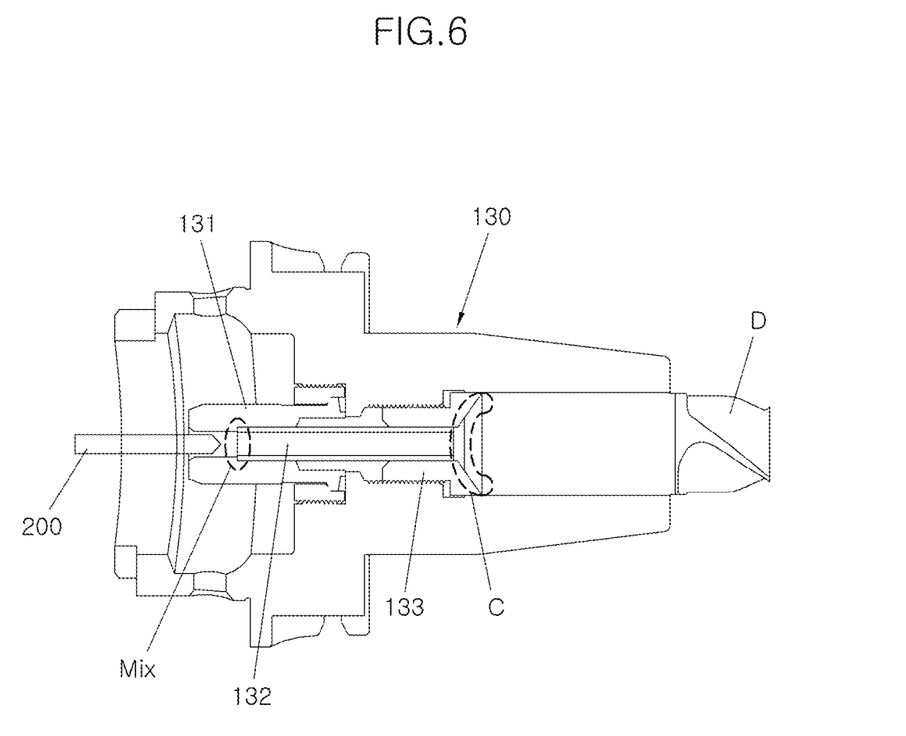
FIG. 6 is a cross-sectional diagram of the drill holder of FIG. 1 in which a cutting tool is mounted.
Figure 7:
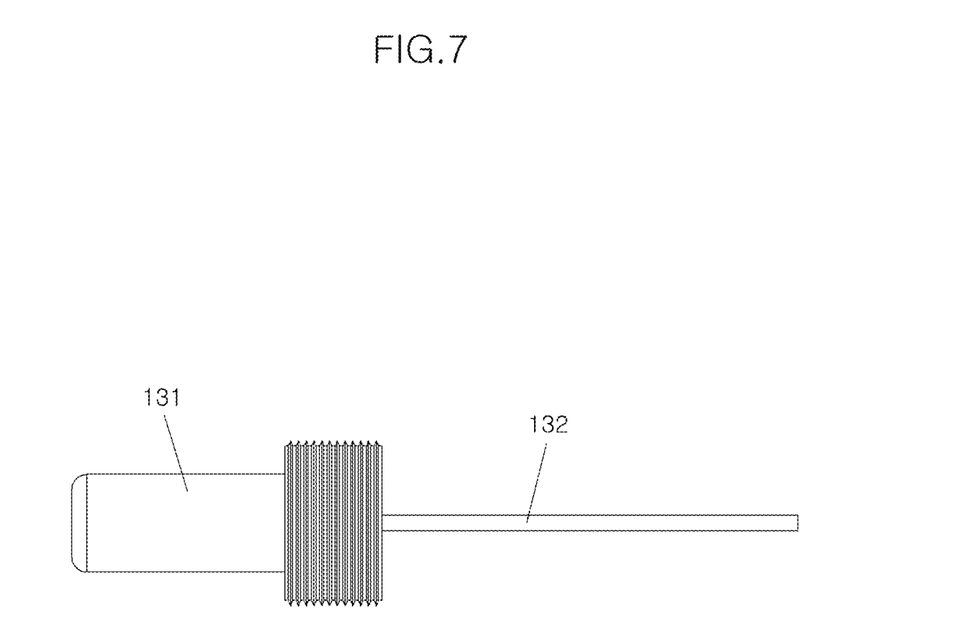
FIG. 7 is a perspective diagram of a MQL tube and a still tube of FIG. 6.

The steel tube 132 is provided to be concentric with the MQL tube 131. The steel tube 132 is provided to have a length greater than that of the MQL tube 131. Therefore, the steel tube 132 is extended outwards from the inside of the MQL tube 131. The inner diameter of the steel tube 132 is provided to be greater than the outer diameter of the lance 200. The end portion of the steel tube 132 that is present outside the MQL tube 131 is inserted into the adjusting screw 133.

Figure 8:
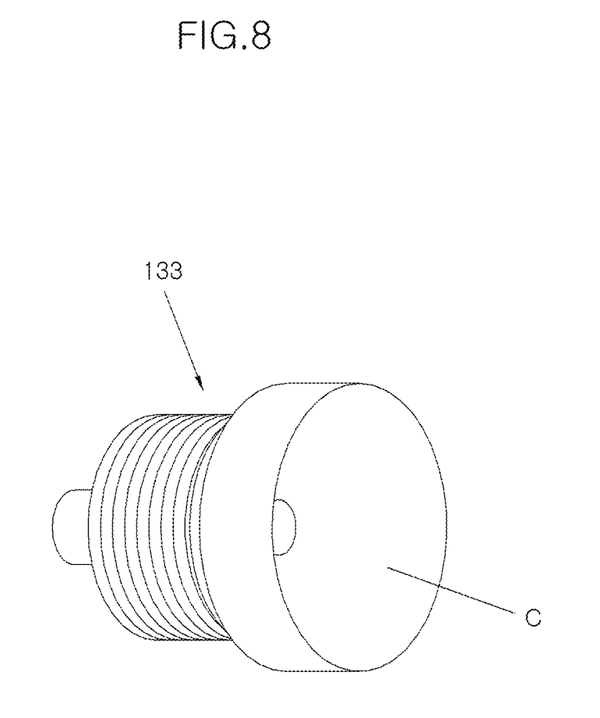
FIG. 8 is a perspective diagram of an adjusting screw of FIG. 6.
Figure 9:
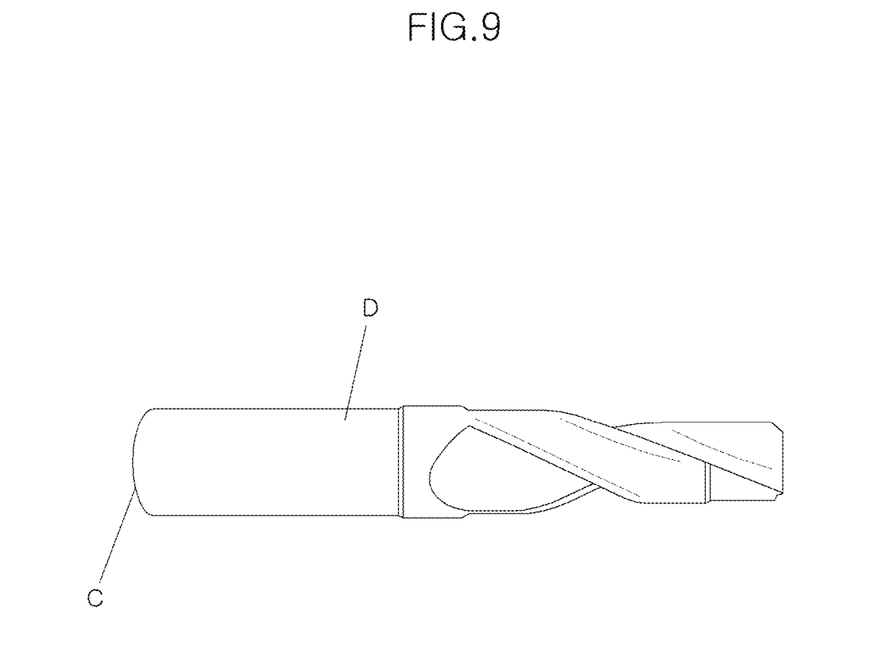
FIG. 9 is a plane diagram of the cutting tool of FIG. 6.

The adjusting screw 133 is in contact with the cutting tool D. One surface of the adjusting screw 133 contacting with the cutting tool D is provided to be gradually expanded. The end portion of the cutting tool D contacting with the adjusting screw 133 is provided to be gradually reduced. The portion where the adjusting screw 133 and the cutting tool D contact with each other is provided to have a 45 degrees chamfer shape C, respectively.

The adjusting screw 133 and the cutting tool D contact with each other in the 45 degrees chamfer shape C, thereby preventing the oil from being formed on the contact area between the adjusting screw 133 and the cutting tool D. The oil is prevented from being formed, such that it is unnecessary to increase the pressure for pushing out the formed oil. Therefore, it is possible to improve the discharge responsiveness.

Figure 10:
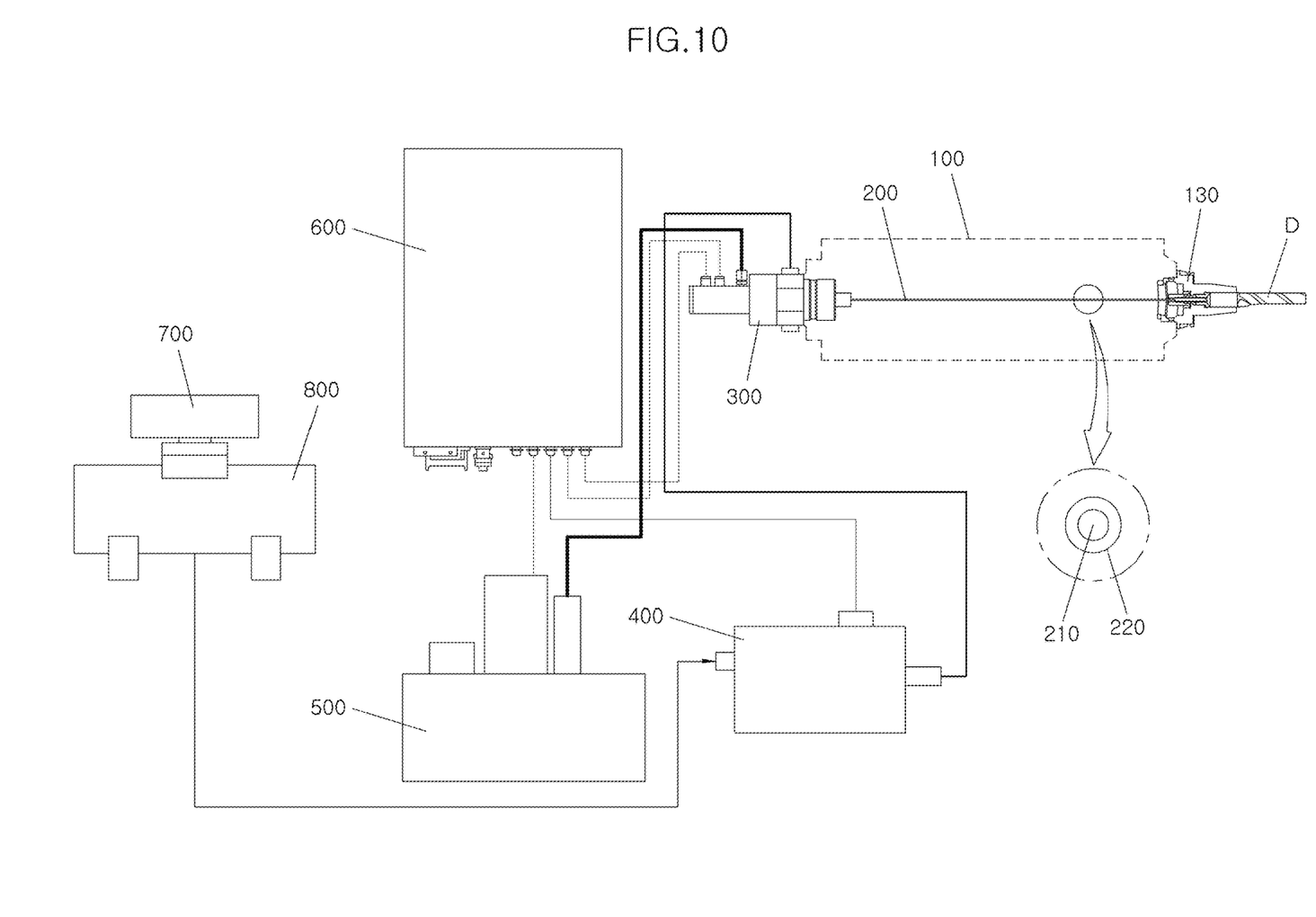
FIG. 10 is a diagram in which the pressure intensifier and a surge tank are provided to the cutting processing system of FIG. 1.

Referring to FIG. 10, the cutting processing system of an embodiment of the present disclosure additionally provides a pressure intensifier 700 and a surge tank 800 to the pneumatic unit 400.

The pressure intensifier 700 intensifies the air supplied from the outside. For example, the air supplied from the outside is 3 to 4 bar. The air intensified through the pressure intensifier 700 is boosted to 6 to 8 bar. The surge tank 800 receives and stores the air intensified from the pressure intensifier 700. The surge tank 800 is connected to the pneumatic unit 400 and supplies the intensified air according to an operation of the pneumatic unit 400.

As the pressure of the air supplied from the pneumatic unit 400 to the lance 200 increases, the discharge pressure of the mist discharged from the cutting tool D increases. Therefore, the chip generated on the cut area does not remain. In some cases, only compressed air may also be supplied through the cutting tool D to the cut area.

Figure 11:
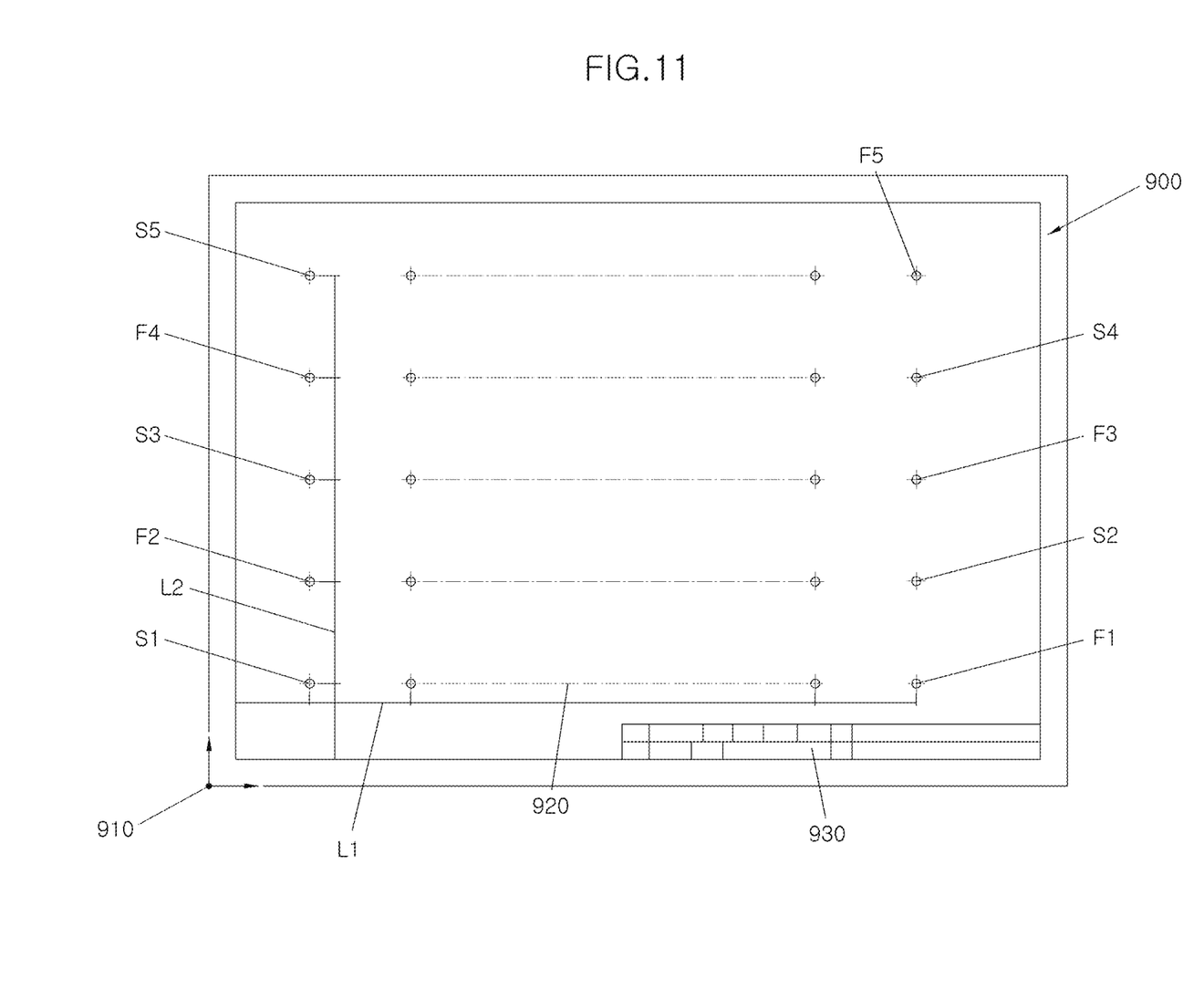
FIG. 11 is a diagram of a performance test paper for evaluating the discharge responsiveness of the cutting processing system of an embodiment of the present disclosure.

The cutting processing system according to an embodiment of the present disclosure configured as described above provides a performance test paper 900 for evaluating the discharge responsiveness of the cutting processing system in order to evaluate the discharge responsiveness regardless of the type of the cutting tool D.

Referring to FIG. 11, the performance test paper 900 for evaluating the discharge responsiveness of the cutting processing system according to an embodiment of the present disclosure is made of a material that smears the mist discharged through the cutting tool D and does not spread. According to an example, the performance test paper 900 may be an oil paper. The performance test paper 900 includes an X-Y coordinate axis 910, a discharge line 920, a test start position point S, a test stop position point F, a horizontal dimension line L1, a vertical dimension line L2, and a remarks column 930.

The X-Y coordinate axis 910 becomes a reference for the horizontal movement and the vertical movement of the spindle 100 in the discharge responsiveness test. The origin (0, 0) of the X-Y coordinate axis 910 is the lower left corner of the performance test paper 900. The discharge line 920 is illustrated to be horizontal with the X-axis of the X-Y coordinate axis 910 in order to become the injecting target of the mixed mist of oil and air through the cutting tool D. The discharge line 920 is provided in plural at regular intervals along the Y axis of the X-Y coordinate axis 910.

The shaft 112 of the spindle 100 starts rotating at the test start position point S. When the cutting tool D moves from the test start position point S and reaches the discharge line 920, the controller 600 operates the rotary union 300, the pneumatic unit 400, and the oil supply unit 500 to inject the mist from the cutting tool D. The cutting tool D stops discharging at the last point of the discharge line 920 and moves to the test stop position point F.

The test stop position point F is provided at the other side of the discharge line 920. The rotation and movement of the spindle 100 are stopped at the test stop position point F. The test start position point S and the test stop position point F are horizontal with the discharge line 920 and are provided in a state of being spaced apart from each other to have a distance from the discharge line 920.

The horizontal dimension line L1 is provided under the discharge line 920. The horizontal dimension line L1 measures the horizontal movement distance of the spindle 100. The vertical dimension line L2 is provided at the side portion of the discharge line 920. The vertical dimension line L2 measures the height movement distance of the spindle 100 and the test cycle.

The remarks column 930 is provided under the vertical dimension line L2. The remarks column 930 is provided to write a test date, the movement speed of the spindle 100, and the RPM of the spindle 100.

The discharge response speed performance test through the performance test paper configured as described above is performed so that the cutting tool D is disposed on the lowermost end thereof and moves to the right side starting from the test start position point S1 provided on the left side thereof. The mist is discharged only to the discharge line 920.

Then, the rotation is stopped at the test stop position point F1 provided on the right side of the discharge line 920 to terminate a first test. After terminating the first test, a second test is performed after the cutting tool D moves vertically without the horizontal movement. The cutting tool D is moved to the test start position point S2 provided to the right side of the second discharge line 920.

The second test starts at the test start position point S2. The cutting tool D moves from right to left, injects the mist to the discharge line 920, and terminates at the test stop position point F2.

That is, the cutting tool D is moved by height for each test cycle, the odd-numbered test is performed by moving the cutting tool D from left to right, and the even-numbered test is performed by moving the cutting tool D from right to left.

According to the cutting processing system of an embodiment of the present disclosure configured as described above, the oil and the air are supplied in a non-mixed state to the cutting tool D through the lance 200. The oil and the air are mixed inside the drill holder 130. The contact area between the cutting tool D and the adjusting screw 133 may be provided in a chamfer shape C, thereby minimizing the mist formation inside the drill holder 130 and securing the mist discharge responsiveness even if a small amount of oil is ultimately supplied as compared with the convention.

In addition, it is possible to supply air to the cutting tool D in a state further pressurized through the pressure intensifier to discharge the mist to the processing portion at a greater pressure, thereby separating the chip generated during the cutting processing from the processing portion more smoothly.

In addition, it is possible to perform the test actually discharging the mist from the cutting tool D toward the performance test paper, thereby evaluating the mist discharge responsiveness through the cutting tool regardless of the type of the cutting tool D.

What is claimed is:

1. A cutting processing system, comprising:
    a spindle mounted with a cutting tool in which a lubrication discharge path is formed along the central axis thereof, the spindle configured for rotating the cutting tool;
    a lance provided inside the spindle in order to supply oil and air to the cutting tool; and
    a rotary union mounted on an end portion of the spindle for supplying the oil and the air to the lance in a non-mixed state,
    wherein the spindle comprises a body having a through hole in which the lance is disposed and a cover mounted on the body to connect the lance with the rotary union,
    wherein the cover comprises:
        a first joint coupled with the end portion of the spindle for guiding a distal end of the lance; and
        a second joint coupled with the first joint for connecting the rotary union with the lance through a coupling part, and
    wherein the coupling part is in a form of a double pipe including a pair of discharge ports for supplying oil and air to the lance, respectively.

2. The cutting processing system of claim 1, wherein the lance comprises:
    an internal pipe through which the oil flows; and
    an external pipe concentric with the internal pipe, disposed outside the internal pipe, and through which the air flows.

3. The cutting processing system of claim 1, wherein the first joint is fixed to an outside of the through hole so that one side end portion of the lance is supported by a bearing and disposed on a central axis of the through hole, and
    wherein the second joint is coupled with the first joint via a fastening member so that the one side end portion of the lance communicates with the pair of discharge ports of the coupling part of the rotary union to receive oil and air, respectively.

4. The cutting processing system of claim 3, wherein the first joint provides a fastening space into which the coupling part is inserted to be fastened with the lance,
    wherein the second joint comprises:
        a first coupling ring through which the coupling part of the rotary union passes and having an end portion inserted into the fastening space; and
        a second coupling ring provided between the first joint and the first coupling ring to be concentric with the first coupling ring,
    wherein the second coupling ring is fixed to the first joint, and
    wherein the first coupling ring is fixed to the second coupling ring.

5. The cutting processing system of claim 4, wherein the fastening member includes a first fastening hole formed in the second coupling ring and a first fastening groove formed in the first joint.

6. The cutting processing system of claim 5, wherein the first fastening hole formed in the second coupling ring coincides with the first fastening groove formed in the first joint.

7. The cutting processing system of claim 5, wherein the fastening member further comprises a bolt to be fastened to the first fastening hole and the first fastening groove, so that the second coupling ring is fixed to the first joint.

8. The cutting processing system of claim 4, wherein the fastening member further comprises a second fastening hole formed in the first coupling ring and a second fastening groove formed in the second coupling ring.

9. The cutting processing system of claim 8, wherein the second fastening hole formed in the first coupling ring coincides with the second fastening groove formed in the second coupling ring.

10. The cutting processing system of claim 9, wherein the fastening member further includes a bolt to be fastened to the second fastening hole and the second fastening groove, so that the first coupling ring is fixed to the second coupling ring.

11. The cutting processing system of claim 1, wherein the spindle comprises:
 a drill holder for holding the cutting tool; and
 a rotating part fastened with the drill holder for rotating the drill holder with an external rotational force,
 wherein one side end portion of the lance is protruded from a center of the rotating part, and
 wherein the air and the oil are received into the drill holder through the lance and then mixed in the state where the drill holder has been fastened to the rotating part.

12. The cutting processing system of claim 11, wherein the inside of the drill holder comprises:
 a Minimal Quantity Lubrication (MQL) tube being concentric with the cutting tool and into which the one side end portion of the lance is inserted;
 a steel tube being concentric with the cutting tool and extended from the MQL tube toward the cutting tool; and
 an adjusting screw in a tubular shape into which one side end portion of the steel tube is inserted and contacting the cutting tool,
 wherein the one side end portion of the adjusting screw contacting the cutting tool is provided to be gradually expanded, and
 wherein one side end portion of the cutting tool contacting the adjusting screw is provided to be gradually reduced.

13. The cutting processing system of claim 12, wherein the air and the oil are mixed in the MQL tube.

14. The cutting processing system of claim 1, further comprising:
 a pneumatic unit for supplying the air to the rotary union;
 an oil supply unit for supplying the oil to the rotary union; and
 a controller for controlling operations of the rotary union, the pneumatic unit, and the oil supply unit.

15. The cutting processing system of claim 14, wherein the pneumatic unit comprises:
 a pressure intensifier for intensifying the air received from the outside; and
 a surge tank for receiving and storing the air intensified from the pressure intensifier.

* * * * *

UNITED STATES PATENT AND TRADEMARK OFFICE
CERTIFICATE OF CORRECTION

PATENT NO. : 11,135,660 B2  
APPLICATION NO. : 16/682681  
DATED : October 5, 2021  
INVENTOR(S) : Nam-Doo Lee Page 1 of 1

It is certified that error appears in the above-identified patent and that said Letters Patent is hereby corrected as shown below:

In the Claims

In Column 9, Lines 17 thru 21:
10. The cutting processing system of claim 9, wherein the fastening member further includes a bolt to be fastened to the second fastening hole and the second fastening groove, so that the first coupling ring is fixed to the second coupling ring.

Should be replaced with:
10. The cutting processing system of claim 8, wherein the fastening member further includes a bolt to be fastened to the second fastening hole and the second fastening groove, so that the first coupling ring is fixed to the second coupling ring.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*